United States Patent Office 3,453,233
Patented July 1, 1969

3,453,233
INHIBITED SYSTEM FOR ORGANOSILICON COMPOUNDS
Donald V. Flatt, Peshtigo, Wis., assignor to Dow Corning Corporation, Midland, Mich., a corporation of Michigan
No Drawing. Filed Jan. 16, 1968, Ser. No. 698,130
Int. Cl. C08g 31/24, 47/00
U.S. Cl. 260—46.5                    22 Claims

ABSTRACT OF THE DISCLOSURE

Organosilicon compositions contain an organosilicon compound of the formula

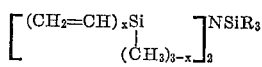

where R is methyl or vinyl and $x$ is 1 or 2 as an inhibitor and crosslinker. The organosilicon composition includes an aliphatically unsaturated composition of 0.1 to 100 weight percent of the above compound and 0 to 99.9 weight percent of an organosilicon compound having an average of at least two aliphatic unsaturated monovalent hydrocarbon radicals per molecule, an organosilicon compound having an average of at least two silicon bonded hydrogen atoms per molecule and a platinum catalyst in an amount of at least 0.1 part per million platinum based on the total weight of the composition. The inhibited organosilicon composition can be used to extend the working time of an organosilicon composition when molecular weight increasing reactions are taking place such as in polymerization and curing.

---

This invention relates to an inhibited system for organosilicon compounds wherein molecular weight increasing reactions are to take place.

Many articles of commerce based on organosilicon compounds are of the type that can be easily formed to a desired shape or applied to a desired area, after which the easily worked material is then cured to retain its desired configuration. For example, polysiloxane elastomers are normally supplied as formable materials ranging from thin pastes to stiff plastic dough-like materials. These materials are shaped by processes, such as molding and extruding, after which the article is converted to the rubbery state by curing, a process often called vulcanization when applied to an elastomer. The article then retains its desired shaped, or if deformed, will seek to return to its vulcanized, or cured configuration. Similarly, polysiloxane resins, obtainable as fluids, fusible solids and solutions are also formed or applied and thereafter cured.

The curing methods employed for organosilicon compounds can be placed into two classes. The first are those that occur spontaneously at room temperature, exemplified by the curing systems such as described in U.S. Patent Nos. 2,833,742; 2,843,555; 2,902,467; 2,934,519 and 2,999,077. The second are those that require heat to activate the curing reaction, such as organic peroxides, and the various sulfur-type cures more commonly used in connection with organic rubber. The instant composition is of the latter type; that is, it is heat activated. The present system is similar to the curing system described in U.S. Patent No. 3,020,260, but differs therefrom in that the present system is inhibited at room temperature from increasing in molecular weight, such as in the curing system.

It is an object of the present invention to provide a novel useful inhibited system for organosilicon compounds, wherein reactions for increasing the molecular weight are inhibited at room temperature.

Another object is to provide a curing system that can be incorporated into an organosilicon compound that is inert at normal temperatures.

A further object is to provide a curing system that is not inhibited by air or components of air.

A further object is to provide a heat activated cure for organosilicon compounds that imparts good stability to the cured system.

These and other objects will be apparent from the following description.

This invention relates to an organosilicon composition comprising:

(A) An organosilicon composition having monovalent aliphatic unsaturated organic radicals consisting essentially of:

(1) 0 to 99.9 weight percent based on the total weight of (1) and (2) of an organosilicon compound having an average of from one to three monovalent organic radicals per silicon atom selected from the group consisting of monovalent hydrocarbon radicals, aliphatic-unsaturation-free monovalent halohydrocarbon radicals and cyanoalkyl radicals, there being an average per molecule of (1) of at least two monovalent hydrocarbon radicals containing aliphatic unsaturation, the remaining valences of the silicon atoms of the said organosilicon compound being satisfied by selection from the group consisting of divalent oxygen atoms, divalent hydrocarbon radicals, divalent hydrocarbon ether radicals and divalent haloarylene radicals, said divalent radicals linking silicon atoms, and (2) 0.1 to 100 weight percent based on the weight of (1) and (2) an organosilicon compound having a formula of

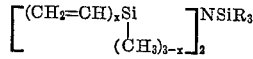

wherein each R is a monovalent radical selected from the group consisting of a methyl radical and a vinyl radical and $x$ is an integer of 1 to 2 inclusive.

(B) An organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by divalent radicals selected from the group consisting of divalent oxygen atoms, divalent hydrocarbon radicals free of aliphatic unsaturation, divalent haloarylene radicals, divalent hydrocarbon ether radicals free of aliphatic unsaturation, said divalent radicals linking silicon atoms, there being an average of at least two silicon-bonded hydrogen atoms per molecule of (B), the sum of the average number of aliphatic unsaturated monovalent radicals per molecule of (A) and the average number of silicon-bonded hydrogen atoms per molecule of (2) being at least 4, and there being present from 0 to 99.45 inclusive parts by weight of (1), from 0.05 to 50 inclusive parts by weight of (2) and from 0.5 to 99.95 inclusive parts by weight of (B).

(C) A platinum catalyst in an amount of at least 0.1 part per million platinum based on the combined weights of (A) and (B).

The organosilicon composition of this invention is unique in that the system, in which organosilicon compounds having aliphatic unsaturated monovalent hydrocarbon radicals, organosilicon compounds having silicon-bonded hydrogen atoms and a platinum catalyst normally react rapidly to produce higher molecular weight materials at room temperature, is inhibited from reacting at room temperature either completely or slowed down considerably from the normal reaction rate at room temperature by the presence of a tris(triorganosilyl)-amine (2) having the formula

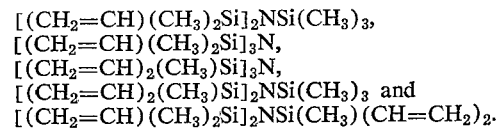

where each R is a methyl or vinyl radical and $x$ is 1 or 2. Examples of the tris(triorganosilyl)amines include $[(CH_2=CH)(CH_3)_2Si]_2NSi(CH_3)_3$,
$[(CH_2=CH)(CH_3)_2Si]_3N$,
$[(CH_2=CH)_2(CH_3)Si]_3N$,
$[(CH_2=CH)_2(CH_3)Si]_2NSi(CH_3)_3$ and
$[(CH_2=CH)(CH_3)_2Si]_2NSi(CH_3)(CH=CH_2)_2$.

The tris(triorganosilyl)amines of this invention are particularly unique in that they perform two functions. The tris(triorganosilyl)amines inhibit the platinum catalyzed reaction between aliphatic unsaturated organosilicon compounds and silicon bonded hydrogen atoms at room temperature. The tris(triorganosilyl)amine also reacts with the silicon bonded hydrogen atoms and thus becomes a part of the product.

The tris(triorganosilyl)amine will inhibit the rate of the platinum catalyzed reaction in amounts as low as 0.1 weight percent based on the weight of (A) and (B). However, when the concentration is between 0.1 and 10 weight percent based on the weight of (A) and (B), the reaction is not stopped at room temperature but is slowed down considerably enabling the composition to be worked with before the composition reaches its optimum molecular weight, which would be infinite, for all practical purposes, in the case of a curing or vulcanization process. When the tris(triorganosilyl)amine is present in amounts greater than 10 weight percent based on the weight of (A) and (B), the platinum catalyzed reaction between aliphatic unsaturated organosilicon compounds and silicon-bonded hydrogen atoms is completely inhibited for all practical purposes.

Organosilicon compound (1) can be a monomeric compound, a resin, a fluid or a substantially non-flowing high polymer such as conventionally used in silicone rubber manufacture. Any monovalent hydrocarbon radical, halohydrocarbon radical or cyanoalkyl radical that can be used with organosilicon compounds as stated above is operable in component (1). Examples of monovalent hydrocarbon radicals that can be used include, for example, alkyl radicals such as methyl, ethyl, isopropyl, tert-butyl, octadecyl and myricyl; cycloalkyl radicals such as cyclopentyl and cyclohexyl; aralkyl radicals such as benzyl and 2-phenylethyl; aryl radicals such as phenyl, tolyl, xylyl, naphthyl, xenyl and anthracyl; and radicals containing aliphatic unsaturation such as vinyl, allyl, methallyl, ethynyl, butadienyl, cyclopentenyl, m-vinylphenyl and the like.

Any monovalent halohydrocarbon radical and cyanoalkyl radical can be used in (1), and include, for example, chloromethyl, 3,3,3 - trifluoropropyl, 2,3 - dibromocyclopentyl, iodophenyl, dichloronaphthyl, 2-cyanoethyl, 2-cyanopropyl, and omega-cyanooctadecyl.

In organosilicon compound (1) there must be an average per molecule of at least two radicals containing aliphatic unsaturation. These radicals enter into the reaction discussed below. More than two said radicals can be present, but a minimum of two (average per molecule) is necessary to obtain a polymeric product. When the average number of aliphatically unsaturated radicals per molecule is more than two, a correspondingly higher cross-linked product is obtained.

The monovalent organic radicals in (1) can be the same or different. In addition, the aliphatically unsaturated radicals can be the same or different. As well, organosilicon compound (1) can be a copolymer, mixture of copolymers, mixtures of monomers and polymers, mixtures of monomers and copolymers, mixtures of monomers and the like.

The remaining valences of the silicon atoms in organosilicon compound (1) are satisfied by divalent oxygen, divalent hydrocarbon radicals, divalent hydrocarbon ether radicals and divalent haloarylene radicals. Any one or more of the said divalent linkages can be present in component (1).

Examples of divalent radicals that can be used in component (1) include, for example, hydrocarbon radicals such as

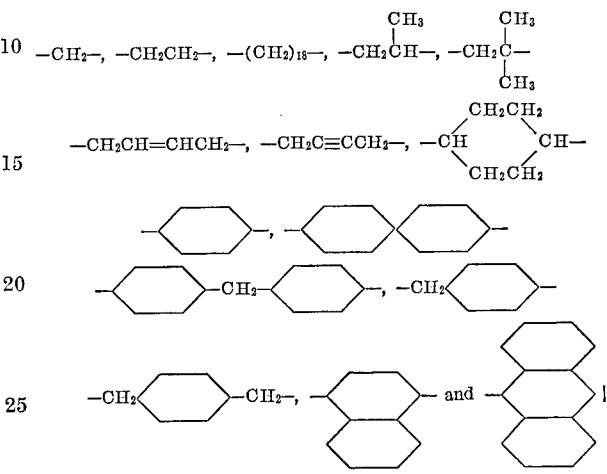

hydrocarbon ether radicals such as $-CH_2CH_2OCH_2CH_2-$, $-CH_2CH_2CH_2OCH_2CH_2-$ and

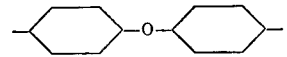

and haloarylene radicals such as

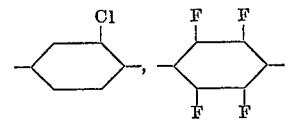

and

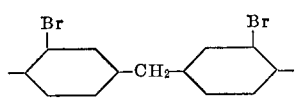

Any of the divalent linkages stated above can be present in component (1). However, where the average number of silicon atoms per molecule is greater than three, it is preferred when use of the finished product will include both extremely high and extremely low temperature exposure, that at least 50 percent of the divalent linkages be oxygen. This is not necessary, however, particularly when component (1) is a cyclic material.

Preparation of materials that can be component (1) are well known in the art. The monovalent radicals can be attached for instance, by either the so-called "direct process," or via Grignard reactions, or in some cases by a pseudo Friedel-Crafts reaction. Other reactions normally used to introduce organic radicals can, of course, be also used. Silicon-bonded oxygen is introduced by hydrolysis of a hydrolyzable group on silicon (such as halogen, alkoxy or acyloxy) as is well known in the art. Divalent organic radicals can be introduced via Wurtz-type synthesis, Grignard, direct process, etc. The preparations of compounds suitable for use as component (1) are well known in the art and need not be recited herein.

Organosilicon compound (1) need not be present, but can be present in amounts up to 99.9 weight percent based on the weight of (1) and (2), preferably, (1) is present in amounts from 0 to 90 weight percent when the reaction is to be inhibited completely at room temperature and from 90 to 99.9 weight percent when the reaction rate is to be slowed down to some desired rate.

Organosilcon compound (B) can be any organosilicon compound having silicon bonded hydrogen atoms. It can contain two or more silicon-bonded hydrogen radicals per molecule and in addition an average of up to two monovalent radicals per silicon atom as above set forth. These can include, for example, alkyl radicals such as methyl, ethyl, isopropyl, tert-amyl, octadecyl and myricyl; cycloalkyl radicals such as cyclopentyl and cyclohexyl; aralkyl radicals such as benzyl, β-phenylethyl and xylyl; and aryl radicals such as phenyl, tolyl, xenyl, naphthyl and anthracyl. In addition, monovalent halohydrocarbon radicals such as chloromethyl, 3,3,3-trifluoropropyl, α,α,α-trifluorotolyl, bromophenyl and 2,3-dibromocyclopentyl can be present in component (B). Also, cyanoalkyl radicals such as cyanoethyl and cyanobutyl can also be present. The organic radicals can be alike or different. Component (B) can be a homopolymer, a copolymer, a monomer or a mixture of two or more of the foregoing, provided only that each is free of aliphatic unsaturation and each contains an average per molecule of at least two silicon-bonded hydrogen atoms.

The remaining valences of the silicon atoms of component (B) are satisfied from divalent oxygen, divalent hydrocarbon radicals free of aliphatic unsaturation (e.g.

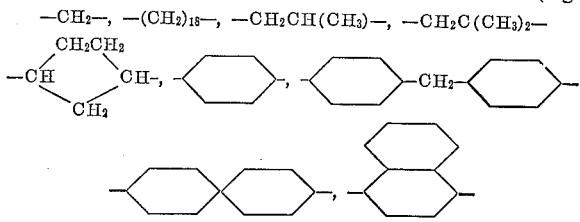

etc.), divalent hydrocarbon ether radicals free of aliphatic unsaturation (e.g.,

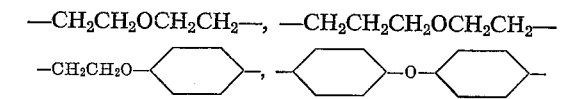

etc.), and divalent haloarylene radicals (e.g.

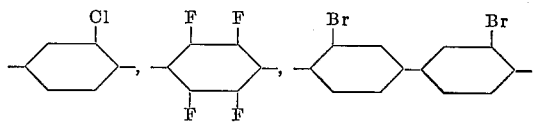

etc.). Any one or more of the above said divalent linkages can be present in component (B). As with component (1), when the average number of silicon atoms per molecule of (B) is greater than three it is preferred that at least 50 percent of the above divalent linkages be oxygen. This is not necessary, however, especially when component (B) is a cyclic material.

Preparation of materials that come within the definition of component (B) are well known in the art, and many examples of such materials are available commercially. Thus, recitation of methods of manufacture of these materials would be redundant herein.

The selection of components (A) and (B) is somewhat inter-related. When the average number of aliphatically unsaturated groups per molecule in component (A) is 2.0, a component (B) should be selected wherein the average number of silicon-bonded hydrogen atoms per molecule is at least 2.0, so that the total of these just defined quantities is 4. The analogous is true when the chosen component (B) contains 2.0 (average) silicon-bonded hydrogen atoms per molecule. When either component has the defined quantity greater than 2.0, selection of the other component on this basis is irrelevant. It should be understood, of course, that the higher the sum of these quantities, the more highly crosslinked can be the resulting composition.

The molar ratio of aliphatic unsaturated radicals in (A) to the silicon-bonded hydrogen atoms in (B) can in some cases be an important consideration. Where is it important, the ratio of these two should be preferably between 0.67 and 1.5. However, there are many instances wherein a balance of these two quantities is unimportant. For example, if a component (A) has, say, an average of six aliphatic unsaturated groups per molecule, the use of equal molar amounts of silicon-bonded hydrogen atoms may well give a product too tightly crosslinked for the desired end use. Thus, less than, sometimes much less than, the equal molar amount of SiH would be used to provide the desired degree of cure. However, when maximum stability is required it is desirable to match the molar quantities of silicon-bonded hydrogen atoms in (B) to the aliphatic unsaturated radicals in (A).

Platinum compound (C) can be any of the known forms, ranging from platinum as such or as deposited on carriers such as silica gel, alumina or powdered charcoal, to platinic chloride, salts of platinum and chloroplatinic acid. Any of these forms will function in the instant system. A preferred form of platinum is the chloroplatinic acid either as the commonly obtainable hexahydrate or the anhydrous form, on account of its easy dispersibility in organosilicon systems and its non-effect on color of the mixture. Additional platinum compounds include, $PtCl_2[P(CH_2CH_2CH_3)_3]_2$, platinum bromides, a complex of platinous halide and an olefin such as ethylene, propylene, butylene, cyclohexane and styrene, $Pt(CH_3CN)_2Cl_2$,
$[Pt(CH_3CN)_2(CH_3)_4]Cl_2$,
$Pt(NH_3)_2Cl_2$,

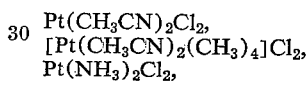

$PtBr_2(C_2H_4)_2$,
$K[PtBr_3(C_2H_4)]$,
$PtCl_2(C_2H_4)$,
$(CH_3)_2C=CH_2 \cdot PtCl_2$,
$H_2Pt(CN)_4 \cdot 5H_2O$,
$H[PtCl_3(CH_3CN)]$,
$Pt(NH_3)_2(CNS)_2$,
$[Pt(NH_3)_4] \cdot [PtCl_4]$,
$PtCl_2[P(CH_2CH_3)_3]_2$,
$PtCl_2 \cdot PCl_3$,
$PtCl_2 \cdot P(OH)_3$,
$PtCl_2 \cdot P(OCH_2CH_3)_3$,
$PtCl_2 \cdot [P(OCH_2CH_3)_3]_2$,
$Pt(OOCCH_2SCH_2CH_3)_2$,
$Pt(CN)_3$,
$(CH_3)_4Pt$,
$(CH_3)_3Pt-Pt(CH_3)_3$,

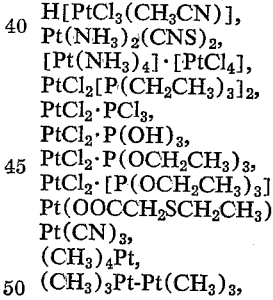

$PtCl_2CO$ and $PtBr_2CO$.

There should be at least 0.1 part per million of platinum present in the mixture, based on the combined total weight of (1) and (2). However, since impurities in the system may easily poison this small quantity of catalyst, it is preferred to employ from 1 to 20 parts per million of platinum. A greater amount of the platinum does not affect the reaction, but does affect the requirement of component (2) above, and economic considerations suggest the lower amounts mentioned.

When present in sufficient amount, component (2) completely prevents the platinum from catalyzing at room temperature (and up to about 60° C.) the reaction between the SiH in (B) and aliphatically unsaturated radicals in (A).

Regardless, for any overall matrix involving this system, there is an easily determined minimum requirement of tris(triorganosilyl)amine (2) that will effectively neutralize at ordinary temperatures the catalytic tendency of the platinum toward causing interaction of SiH groups with aliphatically unsaturated redicals, depending on the matrix in which it is employed. This minimum is easily determined by the skilled worker. There is no advantage, neither is there disadvantage other than waste of tris(triorganosilyl)amine to use more than the minimum amount, although it may be preferred to use about 50 percent excess over the minimum determined amount as a safety margin for complete inhibition.

The use of tris(triorganosilyl)amine to completely prevent room temperature cure of the stated organosilicon system is only one way in which it can be employed. The tris(triorganosilyl)amine can also be added in less than sufficient amount that completely prevents reaction at room temperature. In this event the rate of reaction at room temperature of the system is slowed according to the amount of tris(triorganosilyl)amine added. This is extremely useful in a system which, if comprising only components (1), (B) and (C) of this invention would cure in, say, four hours at room temperature, but which with the addition of the proper amount of tris(triorganosilyl)amine (2) would require, for instance, 24 hours at room temperature. This would allow an end-user a much longer time in which to use the mixture for coating, dipping, spraying, etc., before any given mixture became cured. In this use of tris(triorganosilyl)amines, inhibiting effect can be negated by heating the composition, preferably above 70° C. to hasten the cure.

Thus, the key component of this invention, which is tris(triorganosilyl)amine (2), can be used to retard a room temperature cure or prevent a room temperature cure (infinite retardation) of a system which cures by the platinum-catalyzed interaction of SiH with unsaturated aliphatic radicals on silicon.

As in the case wherein sufficient tris(triorganosilyl)amine (2) is used to prevent room temperature reaction, the amount of tris(triorganosilyl)amine (2) used to retard the said reaction is dependent upon the amount and nature of the platinum catalyst and other components in the system to be cured. In addition, more tris(triorganosilyl)amine (2) will give more retardation, while less will give less retardation. The amount of tris(triorganosilyl)amine (2) to be used in a given system to obtain a given retardation is easily determined by the skilled worker. The amount of the ingredients (1), (2) and (B) are present in from 0 to 99.45 inclusive parts by weight of (1), from 0.05 to 50 inclusive parts by weight of (2) and from 0.5 to 99.95 inclusive parts by weight of (B), preferably (1) is present in amounts of 0 to 98 inclusive parts by weight, (2) is present in amounts from 0.05 to 40 inclusive parts by weight and (B) is present in amounts from 0.75 to 95 inclusive parts by weight. When the reaction between the silicon-bonded hydrogen atoms and the aliphatic unsaturated radicals is to be completely inhibited, the amount of (1) present is from 0 to 95 inclusive parts by weight, the amount of (2) present is from 10 to 40 inclusive parts by weight and the amount of (B) present is from 1 to 95 inclusive parts by weight.

The components of this invention can be mixed in any order. While the addition of the platinum without the tris(triorganosilyl)amine (2) will cause the beginning of interaction of components (1) and (B). When (1) is present, the extent of reaction in a few minutes time at ordinary temperatures is negligible, within which time the tris(triorganosilyl)amine (2) will normally have been added. In systems where even this small amount of interaction might be deleterious, the tris(triorganosilyl)amine (2) can be added before the platinum. However, a set order is not necessary to the functioning of this system.

The system can be mixed just prior to use (contemplated cure) or can be mixed and stored for later use. In addition, one or more of the components can be omitted, provided only that when components (1), (B) and (C) are present, component (2) must also be present. In addition, the storage of a mixture of components (B) and (C) alone is not preferred, for should moisture be present or be introduced, an undesirable alternate reaction can occur. Thus, components (1) (2) and (B) can be stored together and component (C) added later, or (1), (C) and (2) to which (B) is added later, etc. Further, components (2), (B) and (C) can be conveniently stored together and added to component (1) when desired. Such a system is especially desirable in the silicone rubber field, wherein the diorganopolysiloxane polymers each have essentially the same amount of aliphatic unsaturation, wherefore the addition of components (2), (B) and (C) as a premixture is quite feasible.

As stated earlier, with sufficient tris(triorganosilyl)amine (2) the reaction system is stable; that is, it does not cause reaction of the organosilicon composition, at ordinary temperatures. For instance, even at 49° C. (120° F.) a fluid composition corresponding to the instant invention with sufficient tris(triorganosilyl)amine (2) showed essentially no change in viscosity after 4 days. At 70° C., however, this same mixture was a vulcanized rubber after 24 hours, and at 150° C. it vulcanized within 10 minutes. Thus, the instant curing system is quite stable to about 50 to 60° C., well above ordinary temperatures.

The reaction is that of addition of an SiH of (B) to an unsaturated radical on silicon of (A). This is a well known reaction, catalyzed by many other materials in addition to platinum. The addition of SiH to allyl on silicon serves to illustrate the reaction as follows:

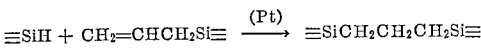

$$\equiv SiH + CH_2=CHCH_2Si\equiv \xrightarrow{(Pt)} \equiv SiCH_2CH_2CH_2Si\equiv$$

It is noteworthy that no byproducts are formed in the reaction. Thus, for example, it is not necessary to cure a system under pressure as is the case when a curing system produces byproducts which are volatile. Further, it is unnecessary to carefully postbake a cured composition, as is necessary with most other heat activated curing systems now used in silicones. It is already well known that a curing system involving SiH and aliphatic unsaturated radicals need not be employed in a closed system. It is also well recognized that neither the extent of cure nor rate of cure are inhibited by air or components thereof.

In addition to the recited components, other materials can be present in a composition utilizing this catalyst system. Such materials as are ordinarily used in organosilicon compositions, such as fillers (carbon black, silica aerogels, silica soots, treated silicas, alumina, clays, metal oxides, metal carbonates, metal silicates, etc.), pigments to impart certain colors to the material, rubber additives such as compression set aids, plasticizers (both organosilicon and organic), etc., can be added to the instant composition. Materials that are known to poison platinum catalysts should, of course, be excluded, but these are not normally included in organosilicon compounds designed to be cured by heat activated curing catalysts.

The instant composition can be used for any application requiring a resin or rubber where heat activated curing is possible. One will immediately recognize the tremendously wide variety of applications herein included. The instant curing system can be activated in closed or open systems, in thin or thick sections and under pressure and at atmospheric pressure with equal ease merely by the application of heat above about 70° C., there being complete freedom from the undesirable sponging associated with some curing systems when pressure is not used, and freedom from uncured surface, obtained particularly with organic peroxides, when the composition is cured in the open exposed to the atmosphere. Thus, advantages of this particular system include excellent thick-section cure, absence of air-inhibition, and therefore uniform cure throughout the sample. In addition, where desired, the system can serve to control (slow down) the rate of cure of a platinum catalyzed SiH— unsaturated aliphatic-on-silicon room temperature cure.

The following examples are illustrative only and should not be construed as limiting the present invention which is properly delineated in the appended claims.

EXAMPLE 1

A mixture of 185.4 g. of $[(CH_2=CH)(CH_3)_2Si]_2NH$ and 40.96 g. of sodium amide in 200 ml. of toluene was refluxed at 70° C. for 24 hours. A 500 ml. 3-necked flask equipped with a stirrer, condenser and a nitrogen sparge was used. A nitrogen sweep was used during the entire process. The unreacted sodium amide was removed from the toluene solution by vacuum filtration in the absence of air. The unreacted $[(CH_2=CH)(CH_3)_2Si]_2NH$ was removed by stripping. The residue was dissolved in hexane and 114.0 g. of trimethylchlorosilane was added to the solution. The solution was then heated for 5 hours at 50° C. under a nitrogen atmosphere. The product $[(CH_2=CH)(CH_3)_2Si]_2NSi(CH_3)_3$ was obtained by distillation. 107.3 g. of product was obtained (yield 41%). The $[(CH_2=CH)(CH_3)_2Si]_2NSi(CH_3)_3$ had a melting point of 66° C. and the elemental analysis agrees with the formula.

Element.—Found, percent: C, 51.4; Si, 32.9; H, 10.8; N, 5.4. Theory, percent: C, 51.3; Si, 32.7; H, 10.6; N, 5.4.

EXAMPLE 2

Several mixtures of $$[(CH_2=CH)(CH_3)_2Si]_2NSi(CH_3)_3$$

and a polymer $H(CH_3)_2SiO[(CH_3)_2SiO]_xSi(CH_3)_2H$ where $x$ has an average value of 15.2 were prepared. The mixtures were each catalyzed with 0.014 g. of chloroplatinic acid (12 parts by weight per million platinum). In each of the following mixtures, 3.000 g. of $$H(CH_3)_2SiO[(CH_3)_2SiO]_xSi(CH_3)_2H$$

was used while the amount of $$[(CH_2=CH)(CH_3)_2Si]_2NSi(CH_3)_3$$

was varied.

| Mixture | $[(CH_2=CH)(CH_3)_2$ $Si]_2NSi(CH_3)_3$ (g.) | $CH_2=CHSi$ HS |
|---|---|---|
| A | 0.654 | 1.067 |
| B | 0.623 | 1.025 |
| C | 0.561 | 0.916 |
| D | 0.595 | 0.971 |
| E | 0.5420 | 0.882 |
| F | 0.5544 | 0.903 |
| G | 0.5606 | 0.916 |
| H | 0.5669 | 0.924 |
| I | 0.5793 | 0.94 |

Mixtures A, B, C and D in vials were placed in a 90° C. oven overnight. The mixtures increased in viscosity indicating that polymerization had taken place.

Mixtures E, F, G, H and I in vials were allowed to stand at room temperature overnight. The mixture remained unchanged. These mixtures were then placed in a 50° C. oven for 24 hours. The mixtures remained unchanged. The mixtures were then placed in a 90° C. oven for 8 hours. The mixtures increased in viscosity indicating that polymerization had taken place.

The viscosities of the products were measured on a Hoake Rotovisiometer. The viscosities in centipoise were as follows:

| Product: | Viscosity, cp. |
|---|---|
| $H(CH_3)_2SiO[(CH_3)_2SiO]_xSi(CH_3)_2H$ | 9 |
| A | 76 |
| B | 191 |
| C | 4099 |
| D | 856 |
| E | 185 |
| F | 1287 |
| G | 2930 |
| H | 9979 |
| I | 568 |

The products were copolymers with the following general unit formulae

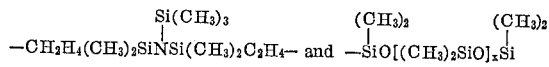

EXAMPLE 3

The following mixture is stable at room temperature for more than a month, but cures to a coherent solid when heated above 70° C.:

100 parts by weight of a phenylmethylhydrogensiloxy-endblocked polydimethylsiloxane having a viscosity of 100,000 cs. at 25° C., 2 parts by weight of a fluid copolymer of the average formula

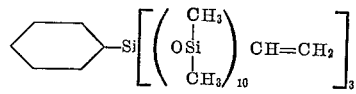

0.002 part by weight platinum added as a solution of platinum sulfate in ethanol, and 5 parts by weight of $[(CH_2=CH)(CH_3)_2Si]_2NSi(CH_3)_3$.

EXAMPLE 4

When the following two siloxane mixtures are prepared:

Mixture A 100 parts by weight of a dimethylvinylsiloxy-endblocked dimethylpolysiloxane having a viscosity of 2,500 cs. at 25° C., 30 parts by weight of calcined diatomaceous earth, 25 parts by weight of fine particle size zirconium silicate, 1 part by weight of butylcarbitol acetate containing 0.19 percent platinum as chloroplatinic acid.

Mixture B 100 parts by weight of the same dimethylpolysiloxane as in A, 120 parts by weight of calcined diatomaceous earth, 25 parts by weight of fine particle size zirconium silicate, 40 parts by weight of a mixture of iron oxide in a hydroxylated low viscosity dimethylpolysiloxane, there being 10 percent by weight of iron in the mixture, 59.5 parts by weight of a trimethylsiloxy-endblocked methylhydrogenpolysiloxane having an average per molecule of 10 silicon atoms, and when 100 parts by weight of Mixture A and 4 parts by weight of Mixture B are mixed, the sample cures to a rubber in 24 hours at room temperature, but cures to a rubber in 15 minutes when heated to 150° C.

When 100 parts by weight of Mixture A, 4 parts by weight of Mixture B and 2.0 parts by weight of $[(CH_2=CH)(CH_3)_2Si]_2NSi(CH_3)_3$ are mixed, the mixture remains unchanged for more than two weeks, but cures to a rubber in 15 minutes when heated to 150° C.

EXAMPLE 5

When the following mixture is prepared:

Mixture C 100 parts by weight of a vinyldimethylsiloxy-endblocked dimethylpolysiloxane having a viscosity of 2,500 cs. at 25° C., 80 parts by weight of ground quartz having an average particle size of 5 microns, 1 part by weight of butyl carbitol acetate containing 0.19 percent platinum as chloroplatinic acid, and when 100 parts by weight of Mixture C and 4 parts by weight of Mixture B shown in Example 4, is mixed, the mixture cures to a rubber in 4 hours.

When 97 parts by weight of Mixture C, 3 parts by weight of a paste containing 50 percent by weight of a dimethylpolysiloxane having a viscosity of 100 cs. at 25° C. and 50 percent by weight of zinc oxide, 4 parts by weight of Mixture B, and 0.15 parts by weight of [(CH$_2$=CH)(CH$_3$)$_2$Si]$_2$NSi(CH$_3$)$_3$ are mixed, the mixture requires 24 hours at room temperature to cure a rubber.

EXAMPLE 6

Equivalent results are obtained when powdered metal platinum supported on gamma-alumina or

[(CH$_3$CH$_2$CH$_2$CH$_2$)$_3$P]$_2$PtCl$_2$ are substituted in equivalent amount for the butyl carbitol acetate of chloroplatinic acid in Example 4.

EXAMPLE 7

When any of the following polysiloxanes are substituted for the dimethylpolysiloxane in Mixture A and 100 parts by weight of Mixture A, 4 parts by weight of Mixture B and 20 parts by weight of

[(CH$_2$=CH)(CH$_3$)$_2$Si]$_2$NSi(CH$_3$)$_3$ as described in Example 4 are mixed, the mixtures which are more stable at room temperature than those not containing the [(CH$_2$=CH)(CH$_3$)$_2$Si]$_2$NSi(CH$_3$)$_3$ are formed.

(a) A methylphenylallylsiloxy-endblocked methyl-3,3,3-trifluoropropylpolysiloxane having a viscosity of 50,000 cs. at 25° C.

(b) A dimethylcyclopentenylsiloxy-endblocked copolymer containing about 50 mol percent ethylmethylsiloxane units, 5 mol percent octadecylmethylsiloxane units, 20 mol percent 2-phenylethylmethylsiloxane units and 25 mol percent units of the formula

and having a viscosity of 250,000 cs. at 25° C.

(c) A mixture of (1) 10 parts of a 2-butynyldimethylsiloxy-endblocked β-cyanoethylmethylsiloxane fluid having a viscosity of 700 cs. at 25° C. and (2) 90 parts of a hydroxy-endblocked copolymer containing 98 mol percent chlorophenylmethylsiloxane units and 2 mol percent vinylethylsiloxane units, having a viscosity of 550 cs. at 25° C.

(d) a vinyldimethylsiloxy-endblocked copolymer containing 70 mol percent dimethylsiloxane units, 10 mol percent diphenylsiloxane units, 5 mol percent benzylmethylsiloxane units and 15 mol percent units of the formula

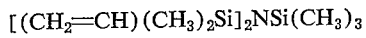

and having a viscosity of 25,000,000 cs. at 25° C.

(e) A copolymer containing 89.86 mol percent dimethylsiloxane units, 0.14 mol percent methylvinylsiloxane units and 10 mol percent units of the structure —(CH$_3$)$_2$SiCH$_2$Si(CH$_3$)$_2$O— having a Williams plasticity of 0.100 inch.

EXAMPLE 8

When equivalent quantities of the following organosilicon compounds are substituted for the methylhydrogenpolysiloxane of Mixture B and 4 parts by weight of the resulting mixture is mixed with 100 parts by weight of Mixture A and 2.0 parts by weight of

[(CH$_2$=CH)(CH$_3$)$_2$Si]$_2$NSi(CH$_3$)$_3$ similar results are obtained:

(a) 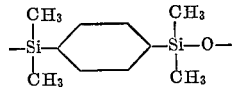

(b)

CH$_3$  CH$_3$
|        |
HSi—⟨⟩—SiH
|        |
CH$_3$  CH$_3$ (c)

$$\left[\begin{array}{c}\text{-CH}_3\\ \text{HSi—O}\\ |\\ \text{CH}_3\end{array}\right]_3 \text{Si}\langle\rangle\text{—O—}\langle\rangle\text{—Si}\left[\begin{array}{c}\text{OSiH}\\ |\\ \text{CH}_3\\ \text{-CH}_3\end{array}\right]_3$$

(d)

$$\text{HSi}\left[\left(\begin{array}{c}\text{CH}_3\\ |\\ \text{OSi}\\ |\\ \text{C}_8\text{H}_{17}\end{array}\right)_{12}\begin{array}{c}\text{CH}_3\\ |\\ \text{OSiH}\\ |\\ \text{CH}_3\end{array}\right]_3$$

(e) A copolymer containing 40 mol percent of

C$_6$H$_5$SiO$_{3/2}$ units, 40 mol percent cyclohexylmethylsiloxane units, 18 mol percent of 2-phenylpropylmethylsiloxane units, and 2 mol percent of methylhydrogen siloxane units having a viscosity of 500 cs. at 25° C.

(f) A mixture containing 10 parts of $$\text{HSi}\begin{array}{c}\text{CH}_3\\ |\\ \\ |\\ \text{CH}_3\end{array}\left[\begin{array}{c}\text{CH}_3\\ |\\ \text{OSi}\\ |\\ \text{CH}_2\\ |\\ \text{CH}_2\\ |\\ \text{CF}_3\end{array}\right]_{12}\begin{array}{c}\text{CH}_3\\ |\\ \text{OSiH}\\ |\\ \text{CH}_3\end{array}$$

85 parts of $$\text{HSi}\left[\text{OSiH}\right]\begin{array}{c}\text{CH}_3\\ \\ \langle\rangle\text{—Cl}\\ \\ \text{Cl}\end{array}\Bigg]_3$$

and 5 parts of

CH$_3$   Cl  Cl   CH$_3$
|         |    |      |
HSi—⟨⟩—SiH
|         |    |      |
CH$_3$  Cl  Cl   CH$_3$

EXAMPLE 9

A mixture was prepared by mixing 50 g. of a mixture consisting of 35 weight percent of a vinyl siloxane resin composed of (CH$_2$=CH)(CH$_3$)$_2$SiO$_{0.5}$ units, (CH$_3$)$_3$SiO$_{0.5}$ units and SiO$_2$ units, 65 weight percent of a methylphenylvinylsiloxy endblocked polydimethylsiloxane having 0.5 mol percent methylphenylvinylsiloxy units and 8 parts by weight per million based on the weight of the total mixture of platinum in the form of chloroplatinic acid with 0.169 g. of [(CH$_2$=CH)(CH$_3$)$_2$Si]$_2$NSi(CH$_3$)$_3$ and heating slightly to dissolve and thoroughly mix the

[(CH$_2$=CH)(CH$_3$)$_2$Si]$_2$NSi(CH$_3$)$_3$

This mixture was cooled to room temperature and then 5 g. of a mixture consisting of 60 parts by weight of a copolymer composed of 20 mol percent of trimethylsiloxy units, 49 mol percent of dimethylsiloxane units and 31 mol percent of methylhydrogensiloxane units and 40 parts by weight of the above vinylsiloxane resin and 2 parts by weight of methylvinylsiloxane cyclics were added and mixed. The resulting mixture was allowed to stand at room temperature. After 16 hours the mixture was still fluid. After 40 hours the viscosity had increased. After 64 hours the mixture was very viscous and after 88 hours the mixture would no longer flow.

The foregoing composition was again prepared as described above except, instead of 0.169 g. of the

[(CH₂=CH)(CH₃)₂Si]₂NSi(CH₃)₃ only 0.065 g. was added. After standing at room temperature for 16 hours the mixture was very viscous and after 40 hours the mixture had cured to a solid.

A control was prepared by using the above mixture except the [(CH₂=CH)(CH₃)₂Si]₂NSi(CH₃)₃ was left out. After 16 hours at room temperature the control was a solid.

EXAMPLE 10

When [(CH₂=CH)(CH₃)₂Si]₃N, (CH₂=CH)₂(CH₃)SiN[Si(CH₃)₂(CH=CH₂)]₂ or [(CH₂=CH)₂(CH₃)Si]NSi(CH₃)₃ replace

[(CH₂=CH)(CH₃)₂Si]₂NSi(CH₃)₃ in Example 9, equivalent results are obtained.

EXAMPLE 11

When the following mixtures are prepared, the reaction at room temperature is retarded, but occurs readily at 90° C.

(A) 0.05 g. of [(CH₂=CH)(CH₃)₂Si]₂NSi(CH₃)₃ and 99.95 g. of
H(CH₃)₂SiO[(CH₃)₂SiO]₈₅₀[H(CH₃)SiO]₄₀Si(CH₃)₂H
(B) 10 g. of [(CH₂=CH)(CH₃)₂Si]₂NSi(CH₃)₃ and 90 g. of
H(CH₃)₂SiO[(CH₃)₂SiO]₂₅₀[H(CH₃)SiO]₅Si(CH₃)₂H
(C) 5 g. of [(CH₂=CH)(CH₃)₂Si]₂NSi(CH₃)₃, 95 g. of CH₂=CH(CH₃)₂SiO[(CH₃)₂SiO]₃₀Si(CH₃)₂CH=CH₂ and 1 g. of (CH₃)₃SiO[H(CH₃)SiO]₂₇Si(CH₃)₃,
(D) 0.05 g. of [(CH₂=CH)(CH₃)₂Si]₂NSi(CH₃)₃, 0.5 g. of (CH₃)₃SiO[H(CH₃)SiO]₂₅Si(CH₃)₃ and 99.45 g. of CH₂=CH(CH₃)₂SiO[(CH₃)₂SiO]₁₆₂Si(CH₃)₂CH=CH₂
(E) 50 g. of [(CH₂=CH)(CH₃)₂Si]₂NSi(CH₃)₃, 0.75 g. of H(CH₃)₂SiO[(CH₃)₂SiO]₆₀Si(CH₃)₂H and 60 g. of (CH₃)₃SiO[(CH₃)₂SiO]₃₀[(CH₂=CH)(CH₃)SiO]₅Si(CH₃)₃
(F) 65 g. of [(CH₂=CH)(CH₃)₂Si]₂NSi(CH₃)₃, 95 g. of H(CH₃)₂SiO[H(CH₃)SiO]₇Si(CH₃)₂H and 35 g. of (CH₂=CHCH₂)(CH₃)₂SiO[(CH₃)₂SiO]₁₀₀Si(CH₃)₂(CH₂CH=CH₂)
(G) 15 g. of [(CH₂=CH)(CH₃)₂Si]₂NSi(CH₃)₃, 37 g. of CH₂=CH(CH₃)₂SiO[(CH₃)₂SiO]₆₁Si(CH₃)₂CH=CH₂ and 0.75 g. of (CH₃)₂SiH₂.

EXAMPLE 12

When a mixture of 10 g. of

[(CH₂=CH)(CH₃)₂Si]₂NSi(CH₃)₃

50 g. of a methylphenylvinylsiloxy endblocked polydimethylsiloxane having a viscosity of 100 cs. at 25° C. and 25 g. of a [H(CH₃)SiO]₅ is stored at room temperature the composition does not cure, but when heated to 125° C., the mixture cures to a rubbery solid in 15 minutes.

When the above process is repeated using a dimethyl vinylsiloxy endblocked poly-3,3,3,-trifluoropropylmethylsiloxane having a viscosity of 200 cs. at 25° C. in place of the methylphenylvinylsiloxy endblocked polydimethylsiloxane, equivalent results are obtained, when the mixture is heated above 80° C. for one hour.

That which is claimed is:

1. An organosilicon composition comprising
(A) an organosilicon composition having monovalent aliphatic unsaturated organic radicals consisting essentially of
(1) 0 to 99.9 weight percent based on the total weight of (1) and (2) of an organosilicon compound having an average of from one to three monovalent organic radicals per silicon atom selected from the group consisting of monovalent hydrocarbon radicals, aliphatic-unsaturation-free monovalent halohydrocarbon radicals and cyanoalkyl radicals, there being an average per molecule of (1) of at least two monovalent hydrocarbon radicals containing aliphatic unsaturation, the remaining valences of the silicon atoms of the said organosilicon compound being satisfied by selection from the group consisting of divalent oxygen atoms, divalent hydrocarbon radicals, divalent hydrocarbon ether radicals and divalent haloarylene radicals, said divalent radicals linking silicon atoms, and
(2) 0.1 to 100 weight percent based on the weight of (1) and (2) of an organosilicon compound having a formula of $$\left[\begin{array}{c}(CH_2=CH)_xSi\\(CH_3)_{3-x}\end{array}\right]_2 NSiR_3$$

wherein each R is a monovalent radical selected from the group consisting of a methyl radical and a vinyl radical and x is an integer of 1 to 2 inclusive,
(B) an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation, and divalent haloarylene radicals, said divalent radicals linking silicon atoms, there being an average of at least two silicon bonded hydrogen atoms per molecule of (B), the sum of the average number of aliphatic unsaturated monovalent radicals per molecule of (A) and the average number of silicon bonded hydrogen atoms per molecule of (2) being at least 4, and there being present from 0 to 99.45 inclusive parts by weight of (1), from 0.05 to 50 inclusive parts by weight of (2) and from 0.5 to 99.95 inclusive parts by weight of (B) and
(C) a platinum catalyst in an amount of at least 0.1 part per million platinum based on the combined weights of (A) and (B).

2. The organosilicon composition according to claim 1 wherein (1) is a triorganosilyl enblocked polydiorganosiloxane having a viscosity of at least 100 cs. at 25° C.

3. The organosilicon composition according to claim 2 wherein the monovalent organic radicals are methyl and vinyl radicals.

4. The organosilicon composition according to claim 2 wherein the monovalent organic radicals are methyl, phenyl and vinyl radicals.

5. The organosilicon composition according to claim 2 wherein the monovalent organic radicals are methyl, 3,3,3-trifluoropropyl and vinyl radicals.

6. A heat curable composition of (A), (B) and (C) of claim 1 wherein (2) is present in an amount of at least 10 weight percent based on the weight of (A) and (B).

7. A heat curable composition of (A), (B) and (C) of claim 2 wherein (2) is present in an amount of at least 10 weight percent based on the weight of (A) and (B).

8. The heat curable composition according to claim 7 wherein the monovalent organic radicals are methyl and vinyl radicals.

9. The heat curable composition according to claim 7 wherein the monovalent organic radicals are methyl, vinyl and phenyl radicals.

10. The heat curable composition according to claim 7 wherein the monovalent organic radicals are methyl, 3,3,3-trifluoropropyl and vinyl radicals.

11. A method for increasing the molecular weight of an organosilicon composition comprising (a) mixing
(A) an organosilicon composition having monovalent aliphatic unsaturated organic radicals consisting essentially of
(1) 0 to 99.9 weight percent based on the total weight of (1) and (2) of an organosilicon compound having an average of from one to three monovalent organic radicals per silicon atom selected from the group consisting of monovalent hydrocarbon radicals, aliphatic-unsaturation-free monovalent halohydrocarbon radicals and cyanoalkyl radicals, there being an average per molecule of (1) of at least two monovalent hydrocarbon radicals containing aliphatic unsaturation, the remaining valences of the silicon atoms of the said organosilicon compound being satisfied by selection from the group consisting of divalent oxygen atoms, divalent hydrocarbon radicals, divalent hydrocarbon ether radicals and divalent haloarylene radicals, said divalent radicals linking silicon atoms, and
(2) 0.1 to 100 weight percent based on the weight of (1) and (2) of an organosilicon compound having a formula

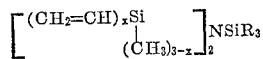

wherein each R is a monovalent radical selected from the group consisting of a methyl radical and a vinyl radical and $x$ is an integer of 1 to 2 inclusive,
(B) an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation, and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average of at least two silicon bonded hydrogen atoms per molecule of (B), the sum of the average number of aliphatic unsaturated monovalent radicals per molecule of (A) and the average number of silicon-bonded hydrogen atoms per molecule of (2) being at least 4, and there being present from 0 to 99.45 inclusive parts by weight of (1), from 0.05 to 50 inclusive parts by weight of (2) and from 0.5 to 99.95 inclusive parts by weight of (B) and
(C) a platinum catalyst in an amount of at least 0.1 part per million platinum based on the combined weights of (A) and (B), and thereafter
(b) heating the mixture at a temperature above 80° C. to increase the molecular weight.

12. The method according to claim 11 wherein (1) is a triorganosilyl endblocked polydiorganosiloxane having a viscosity of at least 100 cs. at 25° C.

13. The method according to claim 12 wherein the monovalent organic radicals are methyl and vinyl radicals.

14. The method according to claim 12 wherein the monovalent organic radicals are methyl, phenyl and vinyl radicals.

15. The method according to claim 12 wherein the monovalent organic radicals are methyl, 3,3,3-trifluoropropyl and vinyl radicals.

16. The organosilicon composition according to claim 1 wherein (2) is present in an amount of 100 weight percent based on the weight of (1) and (2).

17. The organosilicon composition according to claim 16 wherein (2) is

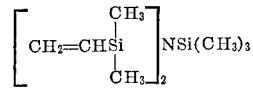

18. The organosilicon composition according to claim 16 wherein (B) is a polydiorganosiloxane of the formula

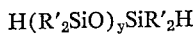

wherein each R' is a monovalent radical selected from the group consisting of a methyl radical, a phenyl radical and a 3,3,3-trifluoropropyl radical and $y$ has an average value at least 1.

19. The organosilicon composition according to claim 17 wherein (B) is a polydiorganosiloxane of the formula

wherein each R' is a monovalent radical selected from the group consisting of a methyl radical, a phenyl radical and a 3,3,3-trifluoropropyl radical, and $y$ has an average value of at least 1.

20. The organosilicon composition according to claim 2 wherein (B) is an organosilicon compound selected from the group consisting of

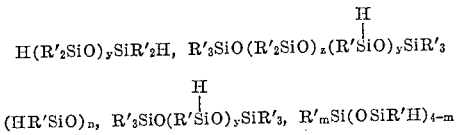

and mixtures thereof, wherein each R' is a monovalent radical selected from the group consisting of a methyl radical, a phenyl radical and a 3,3,3-trifluoropropyl radical, $y$ has an average value of at least 1, $z$ has an average value of at least 1, $n$ is an integer of at least 3, $m$ is an integer of from 0 to 2 inclusive.

21. The organosilicon composition according to claim 1 wherein (1) is present in an amount from 0 to 98 inclusive parts by weight, (2) is present in an amount from 0.05 to 40 inclusive parts by weight and (B) is present in an amount from 0.75 to 95 inclusive parts by weight.

22. The organosilicon composition according to claim 1 wherein (1) is present in an amount from 0 to 95 inclusive parts by weight, (2) is present in an amount from 10 to 40 inclusive parts by weight, and (B) is present in an amount from 1 to 95 inclusive parts by weight.

References Cited

UNITED STATES PATENTS

| 3,020,260 | 2/1962 | Nelson | 260—46.5 |
| 3,188,299 | 6/1965 | Chalk | 260—46.5 |
| 3,192,181 | 6/1965 | Moore | 260—46.5 |

HOSEA E. TAYLOR, Jr., *Primary Examiner.*

M. I. MARQUIS, *Assistant Examiner.*

U.S. Cl. X.R.

117—161; 260—37, 448.2, 825